Figure 3:
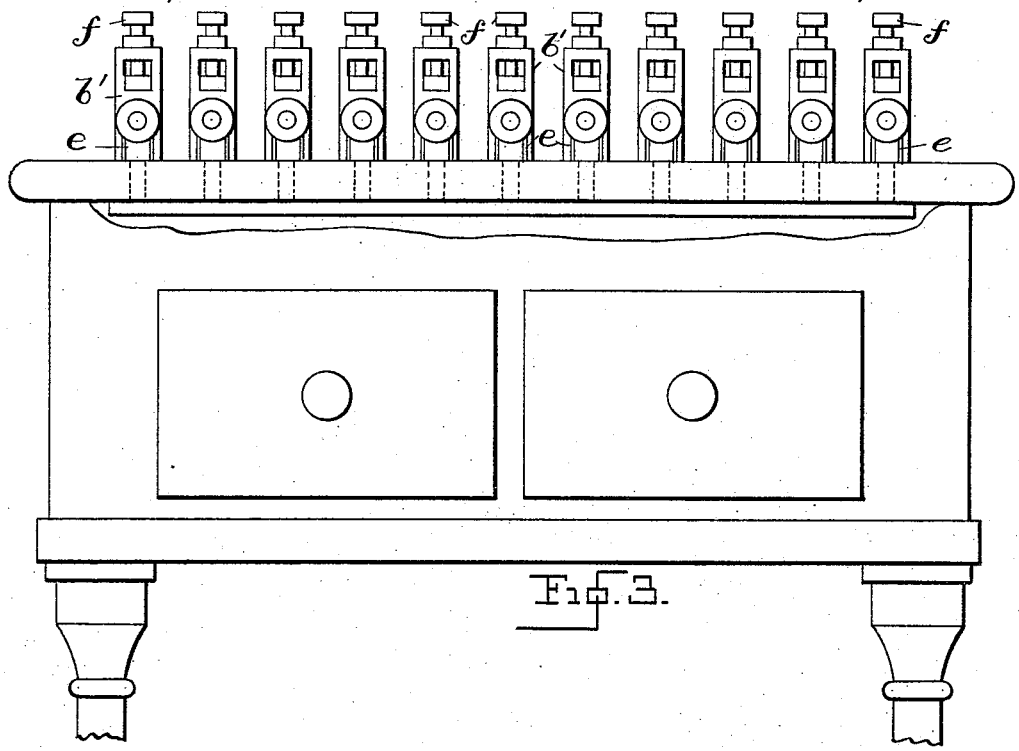

(No Model.) 2 Sheets—Sheet 1.
C. A. CASPERSSON.
DETERMINING THE TEMPER OF IRON OR STEEL.
No. 471,809. Patented Mar. 29, 1892.
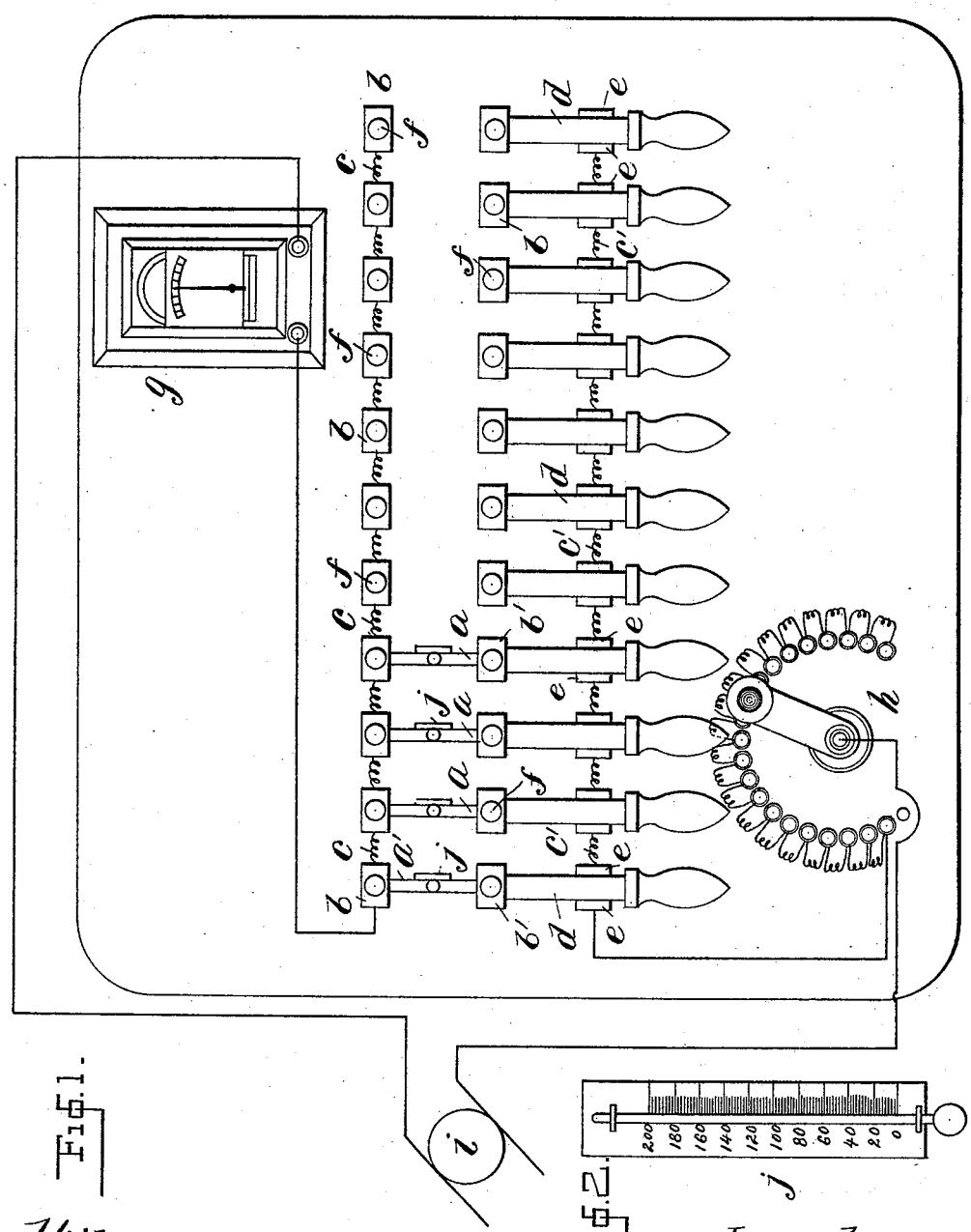
Witnesses
W. H. Courtland
Nellie L. Pope
Inventor
CARL A. CASPERSSON
BY HIS ATTORNEY
Edward P. Thompson (No Model.) 2 Sheets—Sheet 2.

C. A. CASPERSSON.
DETERMINING THE TEMPER OF IRON OR STEEL.

No. 471,809. Patented Mar. 29, 1892.

Witnesses
W. A. Courtland
Nellie L. Pope

Inventor
CARL A CASPERSSON
BY HIS ATTORNEY
Edward P. Thompson

UNITED STATES PATENT OFFICE.

CARL AUGUST CASPERSSON, OF FORSBACKA, SWEDEN.

DETERMINING THE TEMPER OF IRON OR STEEL.

SPECIFICATION forming part of Letters Patent No. 471,809, dated March 29, 1892.

Application filed September 19, 1891. Serial No. 406,225. (No specimens.) Patented in England January 30, 1889, No. 1,683,

*To all whom it may concern:*

Be it known that I, CARL AUGUST CASPERSSON, a subject of the King of Sweden and Norway, and a resident of Forsbacka, Sweden, have invented certain new and useful Improvements in Determining the Temper of Iron or Steel, Case No. 2, (patented in Great Britain, January 30, 1889, No. 1,683,) of which the following is a specification.

In former patents—namely, patents No. 404,600, dated June 4, 1889, and No. 458,784, dated September 1, 1891—I have set forth methods of determining the temper of iron or steel in a manner therein described. The present application relates to an improvement upon the invention described in said patents.

My object is to be able to accomplish the same result of determining the temper of steel in less time, with greater accuracy, and with greater convenience.

It is well known that pure iron becomes steel when combined with certain proportions of carbon. The steel varies in hardness, elasticity, and probably molecular structure, according to the temperature of heat from which it is suddenly cooled. For the same steel different degrees of hardness may exist, as well as for different amounts of carbon in the iron. The word "temper" is here used to indicate the hardness and elasticity of steel, whether due to different amounts of carbon or to different effects which heat has produced. Of course the hardness and elasticity may also be modified by other substances besides carbon.

In carrying out the invention the temperature of the different pieces of steel may be measured by means of thermometers or like instruments, which are placed in contact with each one of the several pieces in the circuit, or else an ammeter may be used, which will indicate the current when the pieces, respectively, reach a certain fixed comparatively low temperature. In the first case observations are made after the current has passed through the pieces of steel for a while, and as the piece of the highest temper is the first which would melt off, if allowed, it is also the one which will show the highest temperature, and the other pieces having a lower temper will show lower temperatures in accordance with the temper. In the second case fuses, gunpowder, phosphorus, wax, or other substances of a certain fixed and comparatively low igniting or melting temperature or alloys or other compounds which may be given such a certain fixed igniting or melting temperature or other substances — such as linen or cotton thread, &c. — which will be blackened or burned, or otherwise change aspect at a certain temperature, may be used. A piece of one of those substances is placed upon or in contact with each of the test and normal steel pieces in the circuit and the current is turned on. As now the piece of the highest temper will be most easily heated, some piece will first reach the igniting, melting, or other critical temperature of the substance placed thereon, and the substance on this piece will first ignite, melt, or burn, as the case may be. By noting the current at which the different pieces reach said temperature the relative tempers of the pieces will also be known.

In using thermometers the method may be carried out in this way. By experiments on normal steel pieces of known temper a thermometer-scale, at the same time being a scale of temper, is procured at first, and said scale is used on the thermometers. In carrying out a test by using said temper-scales any normal steel piece whose temper lies between the limits of the scale—for instance, "75"—is inserted, together with the test-piece or test-pieces in the circuit, and a thermometer is placed upon each of the pieces and the current let on until the normal steel piece in this case is heated to such a degree that its thermometer shows "75" on the scale of temper. Then the current is shut off and the thermometers on the test-pieces are read. If one of them shows, for instance, "145" on the scale of temper, that piece has a temper of 145. If another thermometer shows, for instance, "27," that piece has the temper 27, &c. In using the last-named thermometers the temper will be very sharply indicated.

In order to attain complete uniformity between tests made according to this invention, it is advantageous to apply thermometers, &c., about the middle between the points on the pieces in which the electric current is passed in and out when the pieces are of uniform cross-section.

The apparatus which may be employed for carrying out the invention is illustrated in the accompanying drawings.

Figure 4:
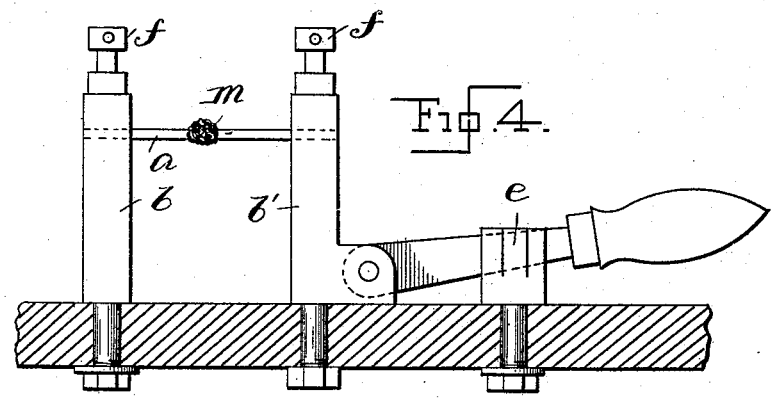

Figure 1 is a plan of the complete apparatus which may be employed. Fig. 2 is an elevation of one of the thermometers for indicating the relative tempers of the pieces of steel. Fig. 3 is an elevation of the apparatus shown in Fig. 1. Fig. 4 illustrates how the second part of my invention may be carried out, and at the same time shows a vertical section of a part of the apparatus represented in Figs. 1 and 3.

$a$ are the pieces of steel whose temper is to be compared to that of the standard steel piece $a'$.

$b\ b'$ are two rows of posts holding opposite ends of the steel pieces $a\ a'$. The posts $b$ are electrically connected to one another by the conductors $c$. The posts $b'$ are in circuit with circuit-closers $d$, which are pivoted to said posts $b'$, and which when in closed circuit press between and upon, respectively, pairs of brushes $e$, which are electrically connected to one another by electrical conductors $c'$. The posts $b\ b'$ are provided with thumb-screws $f$, which retain the pieces $a\ a'$ of steel in the said posts.

$g$ is an ammeter, and $h$ a rheostat, both unnecessary of further explanation than to state that they are in circuit with the electric generator $i$ and with the posts $b$ and brushes $e$. Upon each steel piece $a\ a'$ is a thermometer $j$ provided with a scale.

The operation consists in closing the circuit-closers $d$ and allowing the mercury in the thermometers to be heated by the heat emanating from the pieces $a\ a'$. At the instant when the thermometer on the standard-piece reads "75" the current is turned off and as fast as possible the readings are noted from the other thermometers. If the other thermometers have approximately the same reading, the pieces $a$ of steel are considered as of the correct temper. If any of the readings are different from "75," the temper is proportionally different. In order to overcome atmospheric influences and to concentrate the heat upon the thermometer-bulbs, it is well to apply plaster-of-paris or similar non-conductor of heat to and around the bulb and that part of the wire which is near the bulb; but this precaution is a matter of preference to the operator.

By the second part of my invention I mount upon each piece $a\ a'$ of steel a piece of substance $m$—such as phosphorus, cotton, &c.—which will burn easily, or a fuse—such as easily-fusible alloy, wax, &c.—which will melt easily, or a torpedo, gun-cotton, &c., which will explode easily at a comparatively low temperature. I pass the current through one piece $a\ a'$ of steel at a time and compare relative currents necessary to produce the burning, melting, or exploding of the substance on the pieces $a$ to that current which produces a similar change upon the piece of wax, phosphorus, &c., located on the standard-piece $a'$.

It is evident that my invention may be modified without departing from the spirit of the invention. For example, the thermometers may be employed in the place of the wax, phosphorus, fuse, &c., and the currents compared for causing the thermometer to indicate any predetermined reading.

It will be noticed that it is very important that the bars to be tested shall have the same cross-section and the same length between the electrical supports. If the bars have the same homogeneity also, the same currents will traverse them, and consequently the same degrees of temperature will be indicated on the thermometers; but if the homogeneity is different for the various pieces the thermometers will not be at the same reading. This is, then, the object of the thermometers: to show that the bars are more or less defective. If the thermometers stand alike and like the standard-piece's thermometer, it is evident that all the pieces have substantially the same molecular composition or temper. The more the thermometer-readings differ from that on the standard-piece the greater is the deficiency in quality of the pieces.

I claim as my invention—

The hereinbefore-described method of determining the temper of iron or steel, consisting in conducting electric currents through pieces of iron or steel the temper of which is to be determined and simultaneously through a piece of iron or steel whose temper is known, conducting the heat developed by the currents in said pieces of iron or steel to thermometers until a predetermined degree of heat or temper is indicated upon that thermometer which is upon the piece of iron or steel of known temper, and comparing said degree with the degrees simultaneously indicated upon the remaining thermometers.

In testimony that I claim the foregoing as my invention I have signed my name, in presence of two witnesses, this 28th day of August, 1891.

CARL AUGUST CASPERSSON.

Witnesses:
 FREDRIK L. ENQUIST,
 ROBERT APELGREN,
  *Both of Stockholm.*